Figure 1:
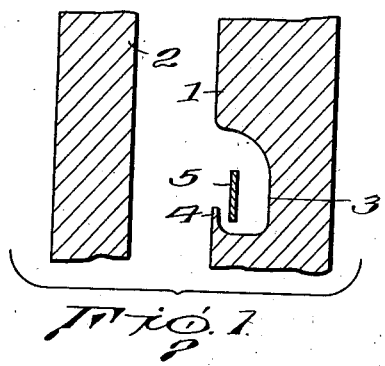

Jan. 9, 1940.   E. W. FAWCETT ET AL   2,186,669
APPARATUS FOR HIGH-VACUUM DISTILLATION
Filed Aug. 7, 1937

Inventors
Eric William Fawcett
Godfrey Burrows
By K. P. McElroy
Attorney

Patented Jan. 9, 1940

2,186,669

UNITED STATES PATENT OFFICE 2,186,669

APPARATUS FOR HIGH-VACUUM DISTILLATION

Eric William Fawcett and Godfrey Burrows, Northwich, England, assignors to Imperial Chemical Industries Limited, a corporation of Great Britain Application August 7, 1937, Serial No. 158,003
In Great Britain August 19, 1936

2 Claims. (Cl. 202—205)

This invention relates to high-vacuum distillation. Short-path high-vacuum distillation may be defined as distillation without ebullition in a high-vacuum, usually of the order of $10^{-2}$–$10^{-6}$ mms. of mercury, between evaporating and condensing surfaces substantially co-extensive in area and separated from each other by a distance of not more than a few inches, e. g., ½–2 inches.

In a known type of short-path still the evaporating and condensing surfaces take the form of vertical (or inclined) substantially parallel surfaces, such as flat or curved plates or concentric tubes, the distilland and distillate flowing down said surfaces by gravity. The present invention is concerned with stills of this type, hereinafter called "vertical surface" stills.

One of the objects achieved in the present invention is the provision of an improved short-path high-vacuum still in which certain disadvantages of ordinary short-path stills are overcome and in which the maximum rate and efficiency of distillation are more nearly approached than in existing short-path stills of the vertical surface type.

A further object of the invention is to provide a method of short-path high-vacuum distillation which will be speedier and more efficient than existing methods.

Further objects will appear hereinafter.

These objects are accomplished by the following invention.

In short path distillation the distilland always comprises a relatively volatile portion, which it is desired to evaporate away from a less volatile portion. We have discovered that in short-path high-vacuum distillation the effective distillation takes place entirely from the outer surface layer of the distilland film. As the distilland flows down the still, the volatile constituent (or constituents) is removed from said outer surface layer and is only relatively slowly replaced by diffusion from the inner layers. The outer surface layer thus becomes impoverished with respect to the volatile constituent, relative to the distilland film as a whole, and the rate of distillation falls off. Further, because the removal of the volatile constituent from the inner layers of the distilland film is incomplete, the residue leaving the evaporation surface may contain appreciable quantities of said volatile constituent. Still further, when the distilland contains several constituents of different volatilities, as the outer surface layer becomes impoverished with respect to the most volatile constituent there is a tendency for one of the less volatile constituents to distil over, with adverse effect on the sharpness of separation of the most volatile constituent from the other constituents.

According to the invention therefore we provide on the evaporating surface, or surfaces, of a vertical surface still, devices which redistribute the distilland film in such a way as to break up surface layers of partially evaporated liquid and expose a fresh outer surface layer of the distilland film. The stratification of the film is broken up several times during the course of the film over the hot surface. Such devices are spaced down the surface at such intervals as are required by the particular film being distilled.

The redistributing means may take various practical forms. Thus they may comprise combinations of recesses and baffles plates, such that the distilland film, or appropriate layers of that film, meet the baffle and recess assembly and a fresh outer surface layer is exposed. Or the distilland film may be transferred from one surface to the other of a double-surface plate or block providing the evaporating surface. Mere projections or even recesses as such on or in the evaporating surface do not usually accomplish the desired object, as there is no reversal of surfaces; the film tends to run over the surface provided by the projection or recess without the desired redistribution of layers occurring.

One very convenient method of carrying out the invention is to provide, at intervals in the path of flow of distilland film over the evaporating surface, strips or bands of gauze. It is found that the distilland film does not simply run over the gauze but goes through it also; it tends to collect and redistribute itself in the meshes, so providing the desired fresh outer surface layer of distilland film over the portion of the evaporating surface below each strip. In this form of the invention, the strips may be separate ones attached to the evaporating surface, or they may be provided by winding a continuous helix of gauze tape round the evaporating surface, with a suitable spacing between each turn. For robustness, metal gauze is preferred, and we have obtained good results by using 100 mesh per inch nickel or Monel metal gauze strips or bands about 3 mms. wide, the strips or turns of the band being disposed say 3 or 4 inches apart. These figures are merely illustrative and are to be varied from case to case, according to the nature of the distilland and the dimensions of the still, etc. Thus, the mesh should be such that the distilland does not merely flow over the gauze, but collects in it and redistributes itself. Generally, the more viscous the distilland or the higher its surface tension, the coarser should be the gauze employed.

Figure 2:
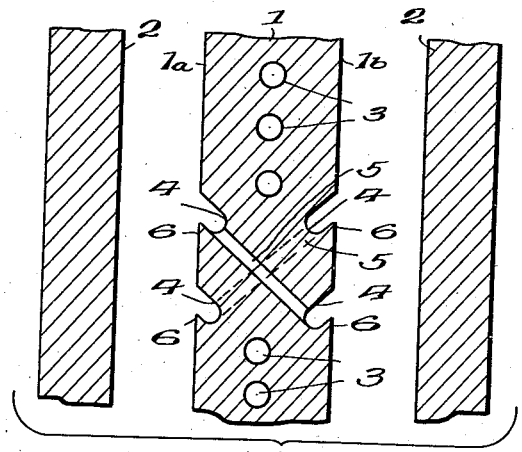
Figure 3:
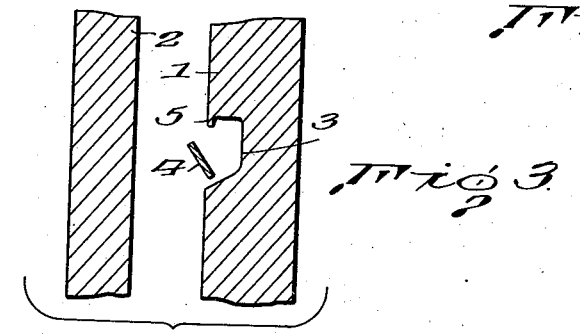
Figure 4:
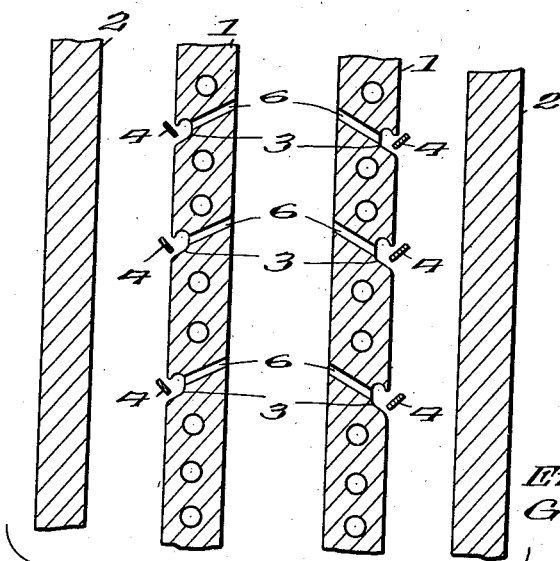
Figure 5:
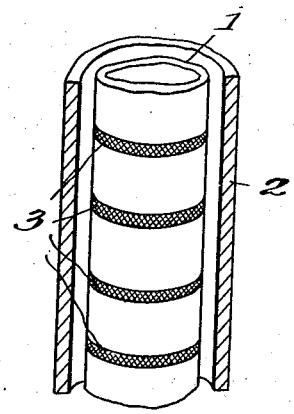

Several forms of the invention will now be described by way of example, with reference to the accompanying drawing, in which Figure 1 is a diagrammatic vertical section through a portion of a short-path still comprising single evaporating and condensing elements, Figure 2 is a diagrammatic vertical section through a short-path still comprising a central evaporating element providing a double evaporating surface, Figure 3 is a diagrammatic vertical section through a short-path still similar to that of Figure 1, and Figure 4 is a diagrammatic vertical section of a short-path still comprising a central cylindrical evaporating element. Figure 5 represents a short-path still comprising a central cylindrical evaporating element shown in perspective surrounded by cylindrical condensing surface shown partly in perspective and partly in section the front portion being cut away to show the central cylinder.

Referring to Figure 1, the evaporating surface 1 is recessed or grooved as shown, to provide a trough 3 in which the distilland film collects and from which it flows again over the edge 4, which may be a straight edge or which may be serrated. A baffle plate 5 is interposed in such relation to the trough 3 that the liquid which previously formed the outer surface of the distilland film tends to be held back, whereas the inside layers can flow underneath the baffle plate and so tend to provide the outer surface layer for the next section of the evaporating surface. The effect is to tend to turn the distilland film over, with a certain amount of mixing.

Referring to Figure 2, the distilland film flows down the two surfaces 1a and 1b of the plate (or cylinder) 1, which consists of a length or coil of seamless metal tubing 3 surrounded by a cast metal block 1. The heating medium flows through the seamless metal tubing. The evaporation surfaces 1a and 1b are faced by the cooled condensing surfaces 2. Grooves or recesses 4 are provided at intervals across (or around) the surfaces 1a and 1b and conduits 5 are also provided, whereby distilland film from surface 1a is transferred to surface 1b and vice versa. The grooves, receiving distilland from the opposite surface have edges 6, which may if desired be serrated, so as to provide an overflow from a well of liquid in the trough back to the evaporating surface and ensure even distribution of distilland film thereon.

Referring to Figure 3, 1 is the evaporating surface and 2 the condensing surface. The surface 1 is grooved or recessed at suitable intervals, the grooves 3 co-operating with inclined baffles 4 in such a way that the distilland leaves the surface at the tips 5 in the form of drops which impinge on the baffles 4. The distilland flows through the space between the lower edge of the baffle and the groove and is so redistributed over the evaporating surface. The space between the tip 5 and the inside of the groove or recess 3 is made sufficient to avoid bridging and to ensure dropping of distilland on to the baffle, while on the other hand the space between the lower edge of the baffle and the lower portion of the groove is made relatively narrow, to ensure the distilland forming a continuous film as it returns to the surface through this space. It is convenient to have the grooves 3 and baffles 4 extending right across the evaporating surface (or to encircle the evaporating surface if it is tubular).

Figure 4 represents a part section through a tubular still, the vertical cylindrical tube 1 forming the evaporating element and the outer concentric tube 2 the condensing element. Owing to the increased rate of distillation per unit area of still surface permitted by the present invention, there is liable to be a greater evolution of gas in the space between the evaporating and condensing surfaces than in an ordinary vertical surface still. Removal of this gas by pumping is normally effected at the top and/or bottom of said space. In order to deal with the greater gas evolution encountered or liable to occur in the operation of the present invention, additional conduits 6 are provided connecting the grooves or recesses 3 with the inside of the heating surface tube 1, and additional pumping through the inside of said tube effects removal of gas at intermediate positions in the space between 1 and 2. In Figure 4, the arrangement is shown in conjunction with the device described with reference to Figure 3.

Figure 5 represents a part of a tubular still, the vertical cylindrical tube 1 forming the evaporating element and the outer concentric tube 2 which forms the condensing surface being shown cut away so as to show the tube 1. Around the cylindrical tube 1 are spaced four strips 3 of 100 mesh per inch nickel gauze 3 mm. wide. When the distilland reaches these strips, it collects and redistributes itself in the meshes, and then flows down the next section of the tube 1 with a fresh outside layer.

The following example illustrates the effect of using the modification of the invention shown in Figure 5.

*Example*

The following comparative experiments on the distillation of a vitamin-containing fish liver oil show the improved results obtainable by the invention.

The apparatus used consisted of two short-path high-vacuum vertical surface stills in series, each with a cylindrical heating surface 2 inches in diameter and 24 inches long. The pressure in the stills was about $10^{-3}$ mms. of mercury. The first still was heated to a temperature of 220–224° C. and the second to 230–239° C. (These temperature ranges correspond to the temperature gradient from the top to the bottom of each heating surface). The fish liver oil was fed to the stills at the rate of 700 grams per hour.

In Experiment 1, the heating surfaces were plain cylindrical glass tubes and in Experiment 2, these were replaced by similar tubes on which was wound a helix of nickel gauze having 100 meshes per linear inch, the helix being 3 mms. broad and the turns being 2 cms. apart. The conditions of distillation in the two experiments were otherwise identical. The results obtained were as follows:—

| Experiment No. | Percent distillate obtained | | Percent vitamin A remaining in residue after distillation treatment |
|---|---|---|---|
| | 1st stage | 2nd stage | |
| 1 | 1.64 | 1.60 | 41.6 |
| 2 | 2.44 | 2.17 | 10.3 |

The much improved performance when using the present invention is shown by the higher percentage of distillate and the much improved recovery of vitamin A in the distillate.

As many apparently widely different embodiments of this invention may be made without departing from the spirit and scope thereof, it is to be understood that we do not limit ourselves to the specific embodiments thereof except as defined in the appended claims.

We claim:

1. In apparatus for short-path high vacuum distillation of volatile substances from less volatile substances in downward flow of a fluent material, a cooled condensing member, a heated distilling member closely spaced from the cool member and presenting vertically extended substantially unobstructed surfaces arranged for flow of a film of fluent distilland thereover by gravity, the distilling member being provided at separate spaced intervals along the height thereof with substantially horizontal grooves extending laterally, and baffles extending along the grooves and extending therein and arranged to pocket and turn over the down flowing film so as to expose new surfaces of the distilland.

2. In apparatus for short-path high vacuum distillation of volatile substances from less volatile substances, cooled condensing means and a double faced heated distilling member closely spaced from the cooled member and presenting vertically extended substantially unobstructed surfaces arranged for flow of films of fluent distilland thereover by gravity, the distilling member being provided with trough-like grooves extending horizontally along the two surfaces, and conduits extending through the member and arranged to deliver distilland by gravity from the grooves on each side of the distilling member to grooves on the opposite side thereof, whereby to reverse the downwardly flowing film at intervals for exposure of fresh material.

ERIC WILLIAM FAWCETT.
GODFREY BURROWS.